May 6, 1924.
W. J. LEVERIDGE ET AL
MACHINE FOR WORKING ON GLASS
Filed Aug. 29, 1919  4 Sheets Sheet 3
1,492,602
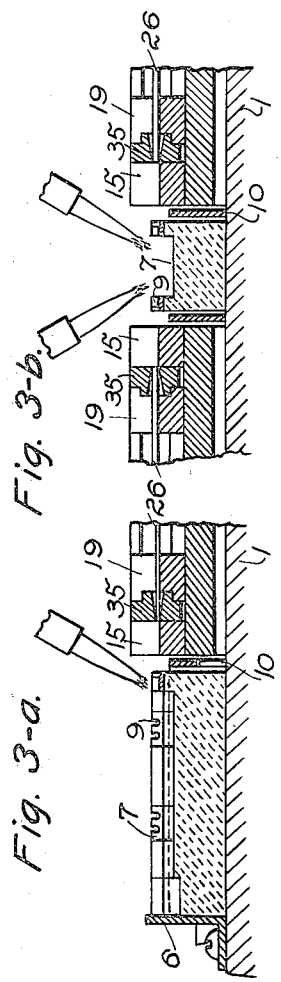
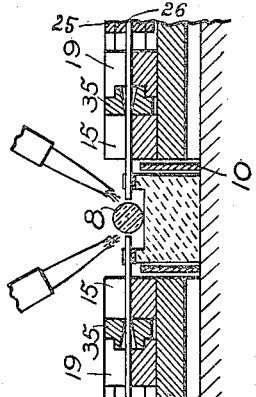
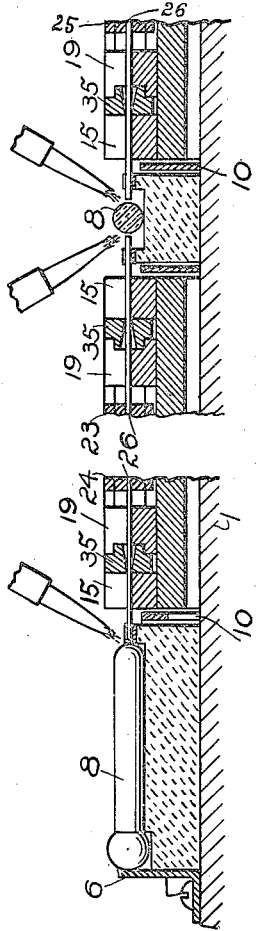
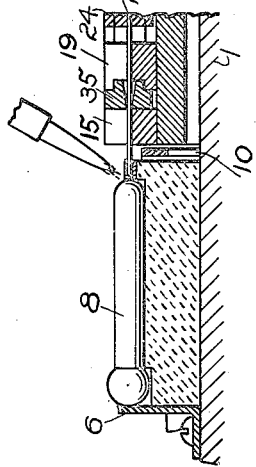
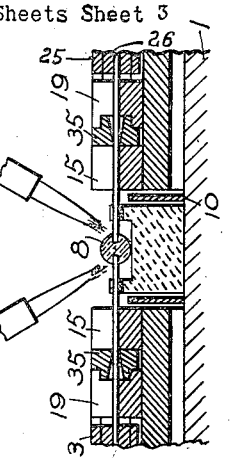
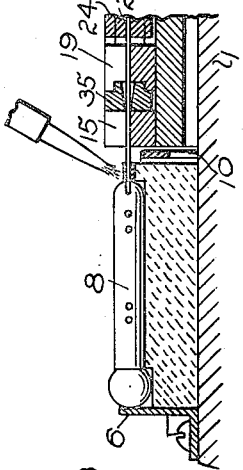
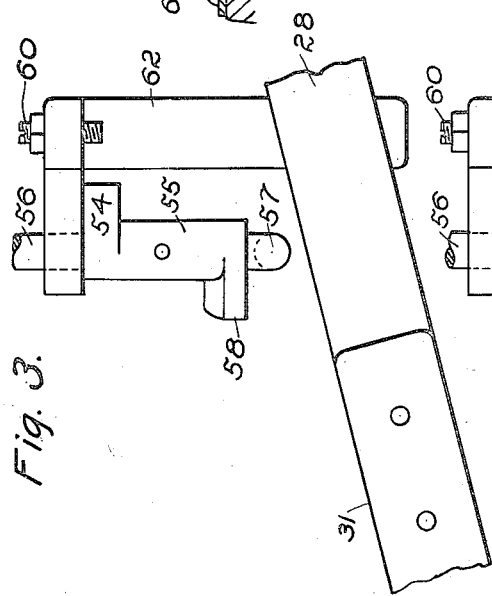
Inventors:
Walter J. Leveridge
Paul Schwerin
by J. E. Roberts
Att'y.

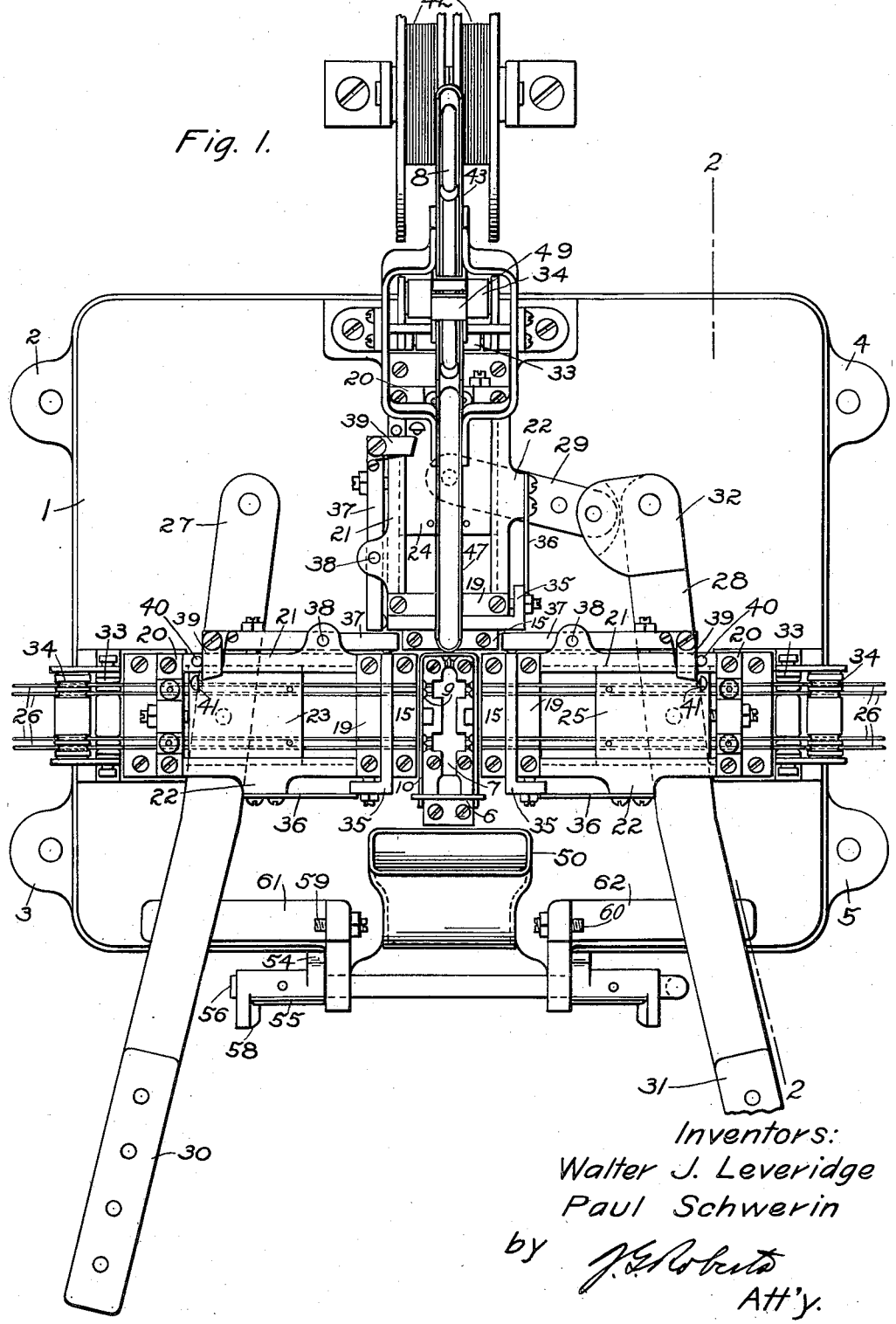

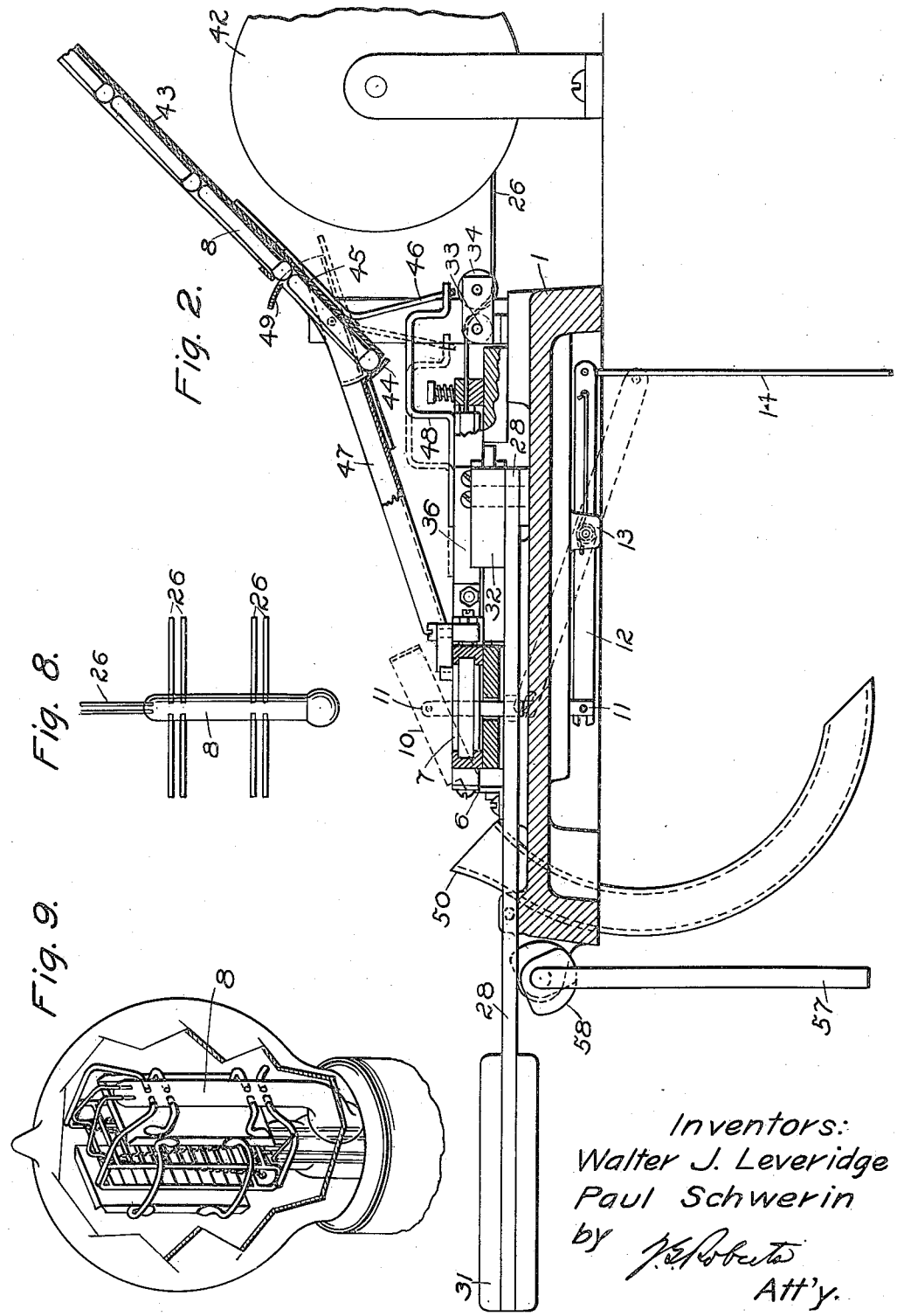

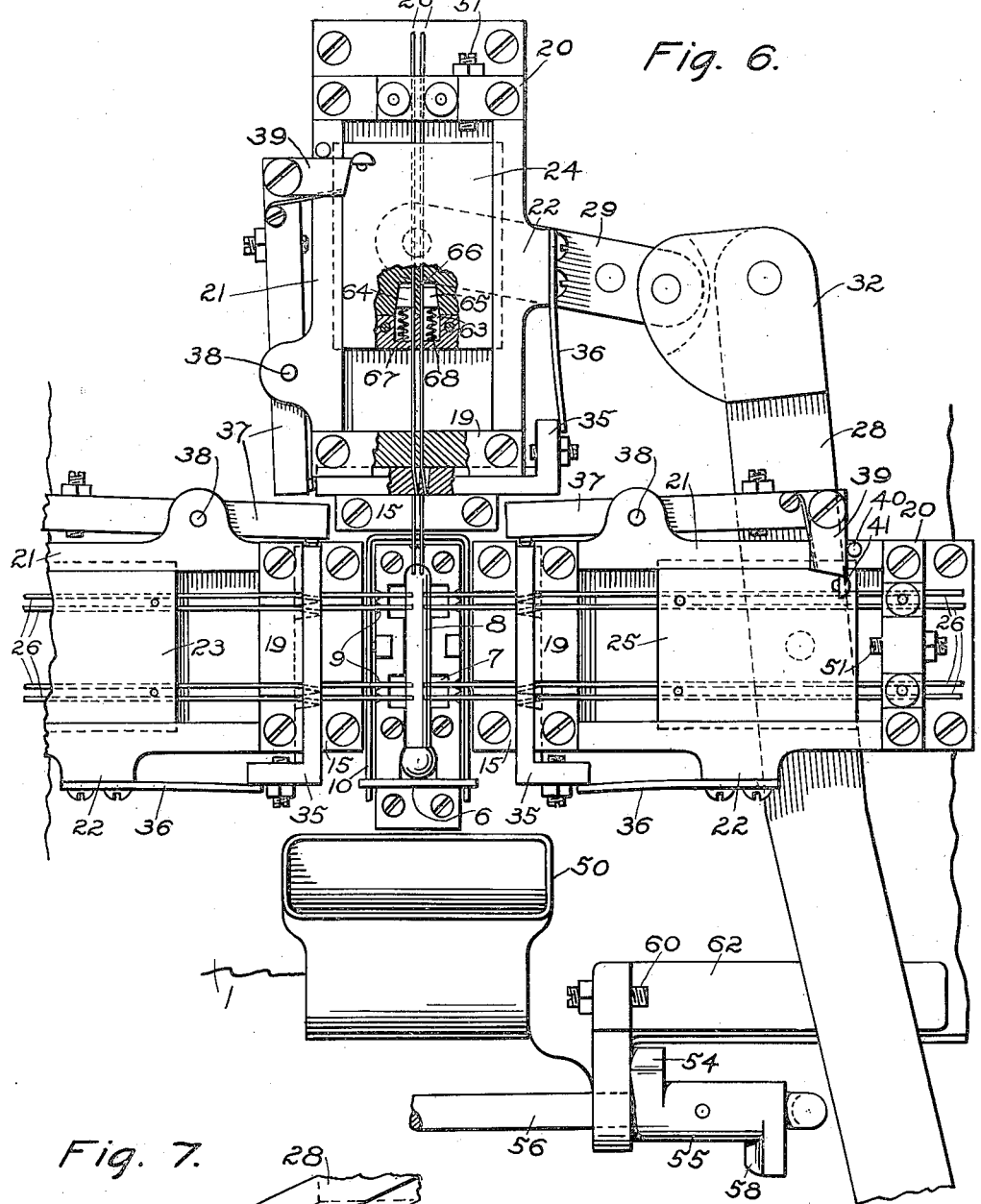
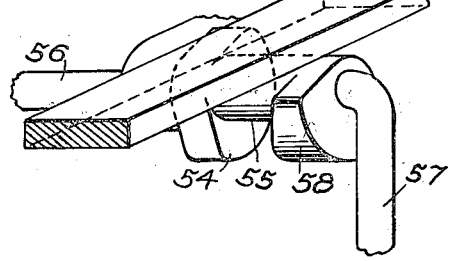

Patented May 6, 1924.

1,492,602

UNITED STATES PATENT OFFICE.

WALTER J. LEVERIDGE, OF MOUNT VERNON, AND PAUL SCHWERIN, OF NEW YORK, N. Y., ASSIGNORS TO WESTERN ELECTRIC COMPANY, INCORPORATED, OF NEW YORK, N. Y., A CORPORATION OF NEW YORK.

MACHINE FOR WORKING ON GLASS.

Application filed August 29, 1919. Serial No. 320,577.

*To all whom it may concern:*

Be it known that we, WALTER J. LEVERIDGE, a subject of Great Britain, and PAUL SCHWERIN, a citizen of the United States, residing at Mount Vernon, in the county of Westchester, State of New York, and at New York, in the county of New York, State of New York, respectively, have invented certain new and useful Improvements in Machines for Working on Glass, of which the following is a full, clear, concise, and exact description.

This invention relates to a method and apparatus for working with glass and has particular reference to the treatment of glass for use within evacuated bulbs such as vacuum tubes.

Its object is to provide a simple method and apparatus whereby metallic wires of proper dimensions may be inserted into the glass to be used within said evacuated vessel, in a manner requiring less manual operation and resulting in a greater quantity production in a given time than heretofore has been accomplished.

The invention in general comprises a platform on which is mounted a mold portion to which the glass parts, cut to desired length, are fed, one after the other. Adjacent this mold portion are a plurality of guides through which the wires to be inserted in the glass are fed by semi-automatic means. Adjacent this mold portion are a plurality of flames which are so directed as, at the proper moment, to heat certain portions of the glass to a point where it is soft. At this time, the feeding means is operated to force a plurality of wires up to a point to contact with the fused glass and then a slow-acting feed mechanism is brought into play to gradually force the wires into the glass to a definite depth. The feeding mechanism is then withdrawn and in the act of withdrawing cuts to a required length the portion of the wires embedded in the glass and at the same time these feeding mechanisms, being one way acting, slide along the remaining wires so that they are left in position ready to be fed forward. Immediately after the feed mechanism has been retracted, an automatic device ejects the prepared glass into a suitable channel leading to a hopper.

The invention is illustrated in the drawings of which Fig. 1 is a plan view; Fig. 2 is a vertical section taken on the line 2—2 of Fig. 1; Fig. 3 is a detailed view of parts of the two feeding mechanisms; Figs. 3$^a$ and 3$^b$ show the relation of the glass mold, the wires and the flames when the feed mechanism is in the position shown in Fig. 3; Fig. 4 shows another position of the feed mechanisms; Figs. 4$^a$ and 4$^b$ show the position of the glass portion, the wires, and the flames when the feed mechanism is in the position shown in Fig. 4; Fig. 5 shows another position of the feed mechanism; Figs. 5$^a$ and 5$^b$ show the position of the glass portion, the wires, and the flames when the feed mechanism is in the position shown in Fig. 5; Fig. 6, is a plan view showing the mechanism in a position when the wires have just been cut-off; Fig. 7 is a detailed view of the relation between the main feed mechanism and the slow-feeding mechanism; Fig. 8 represents the finished product of the operation of this machine; and Fig. 9 shows an evacuated vessel in which the product of this machine is used.

As shown in the drawing, the invention comprises a base plate 1 to which a suitable number of upright standards (not shown) may be attached by ears 2, 3, 4 and 5. Mounted centrally and longitudinally on the base plate 1 is a mold block 6 attached to the plate 1 by screws and having a recess or mold portion 7 which is of the general configuration of a glass rod 8 which is adapted to be placed therein. At the sides and one end of this mold are a plurality of pairs of apertures or slots 9. Immediately adjacent said mold portion 6 and surrounding the same is a rectangular pivoted arm 10 pivoted at its front portion and adapted to be oscillated upwardly around its pivot point by a rod 11 (see Fig. 2). This rod 11 passes through an aperture in base plate 1 and is connected to a lever 12 pivoted to a lug 13 attached to the under side of the base plate and operated by means of a link 14 connected to a foot pedal (not shown). Immediately adjacent the mold 6 and the pivoted ejector 10 on three sides thereof are a plurality of guide plates 15 having slots therein which are in registry with the slots in the mold 6. In line with the guide plates 15 on three sides of the mold 6 are feeding frames, each of which comprises an open rectangular frame having end bars 19 and 20 suitably fastened to the base plate 1 and side bars 21 and 22 also suitably fastened to the base plate. The end bars 19 and 20 have slots therein which are in alignment with the corresponding slots in the mold 6 and in the guide plates 15 above mentioned. Within the open portion of the rectangular guide frames are wire feeding blocks 23, 24 and 25 adapted to slide therein. These blocks are formed with apertures registering substantially with those mentioned above through which the wire 26, which is to be fed, passes. These blocks are connected to pivoted levers 27, 28 and 29 which are suitably pivoted to the base plate 1. The levers 27 and 28 have handle portions 30 and 31 whereby they may be moved. The lever 29 connecting with the block 24 is pivoted at its middle and connected at its other end to a portion 32 of the lever 28 so that it obtains its motion whenever the lever 28 is moved. To the rear of each of the feeding frames are wire guide rolls 33 and 34 attached to the base plate 1 in a suitable manner and so positioned that the wires 26 pass under one and over the other. In this manner any tendency on the part of the wires 26 to curl is eliminated and they are straightened out. At the front end of each of the feed frames is a knife-blade 35 which is adapted to be moved across the path of the wires to cut the same. These knife-blades are provided with apertures through which the wires pass. The knife-blades are held in a normal position by means of spring 36 and are moved away from this normal position by levers 37 pivoted at 38 to the side of the feeding frames and having at their ends laterally extending ears or detents 39 normally held back against stop pins 40 by means of a spring and operated by means of trip pins 41 attached to the feeders' blocks 23, 24 and 25.

Trip pins 41 attached to the rear upper portion of feeding blocks 23, 24 and 25, are adapted to contact with detents 39 on the forward movement of the feeding blocks. As the feeding blocks are fed forward the detents 39 are moved around their pivots against the action of their springs and levers 37 remain stationary during this action. However, on the rearward movement of the feeding blocks, the trip pins 41 encounter the bevelled lower edge of the detents 39 and tend to move the detents back against the stop pin 40. When this point is reached a further movement backward of the trip pin 41 will tend to move the levers 37 around their pivot points, and the forward ends of said levers contacting with the knife-blades 35 will move the knife-blades 35 to cut the wires. As soon as the trip pins 41 have passed beyond the lever 37, these levers will resume their normal position due to the action of springs 36 on the levers 37 through knife-blades 35.

The wires 26 are fed from reels 42 of which only one set are shown. These wires are fed in pairs toward the mould block 6 from three sides thereof, since it is desired to insert the wires in pairs into the glass rod at the points shown in Fig. 8. The glass rods are fed from a suitable hopper, not shown, down a trough 43, see Fig. 2, the rods lying adjacent each other in the trough and the lower rod abutting a stop plate 44. The lower end of the trough 43 in which the lower rod is positioned comprises an oscillating section 45 which normally lies in the general direction of the trough 43, but which is attached to a rod 46 and is adapted to be moved into a position in line with a section 47 which leads from the oscillating section 45 down to the mould block 6. The rod 46 is connected to a rod 48 which is attached to the feeding block 24. As this block is moved forward to introduce the wires into the glass rod already in position the tiltable section 45 is moved in line with the trough section 47 and the glass rod therein slides down section 47 until it contacts with the edge of the oscillating ejector 10. The upper edge of the oscillating section 45 has a flange 49 thereon which, when the section 45 is in line with the trough section 47, is introduced in the path of the upper trough section 43, to prevent the downward movement of the glass rods in said upper section. In this way only one rod at a time is fed from an upper section 43 to the mould block 6.

When the rod 14 is moved by any suitable means to oscillate the ejector 10, the glass rod in the trough section 47 adjacent the ejector 10 will slide down the mould 6 in position to be treated by the flames. As the ejector is moved upward its edges contact with the wires inserted in and projecting from the glass rod already in the mould 6 and lifts the glass rod out of the mold 6 into an inclined position which causes it to slide from the ejector 10 in a hollow curved channel portion 50, the upper end of which is adjacent the mould section 6 and the lower end of which leads to a suitable receptacle for the finished rods.

Assuming the feed blocks 23, 24 and 25 in their extreme retracted position which is determined by the contact of their rear edges with adjustable bolts 51, the handle portions 30 and 31 are moved forward and the wires are fed up to the edge of the glass rod in the position of the mould 6 which has been, we will assume, under the action of the flames a sufficient length of time to soften the parts of the rod into which the wires are to be inserted. The levers 30 and 31 are moved forward until their forward edges contact with stops 54. These stops 54 are mounted on cam sleeves 55 which are in turn mounted on a shaft 56. The shaft 56 at either end has a handle portion 57 by which it may be rotated. On the cam sleeve 55 is mounted another cam surface 58 which is spaced on said sleeve 55 a distance from stop 54 equal to the width of the levers 27 and 28 so that when the forward edges of levers 27 and 28 are contacting with the faces of stop 54 then the rear edges of the levers 27 and 28 are in a position to make contact with the cam surfaces 58 when the stop 54 and cam surface 58 are rotated by means of the handle portions 57. As shown in Figs. 1 and 7, in which lever 28 is shown in its initial position between the cam surface 58 and the stop 54, if the handle portion 57 is moved upward toward the observer it will be noted that the stop 54 will be withdrawn from the forward edge of the levers 27 and 28, and the cam surface 58 will engage with the rear portions of said levers and are so inclined as to move them toward each other until the forward edges of these levers contact with stop bolts 59 and 60 mounted on plates 61 and 62 attached to the base plate 1, and to which plates 61 and 62 the cam sleeves and their operating parts are also attached. By this means, a mechanism for feeding the wires forward slowly at the end of their movement is provided so that the wires are introduced into the molten glass to the desired depth by a slow feed, whereas, they are moved up to the surface of the glass in a comparatively rapid manner.

After the wires have been inserted in the glass, the handles 57 are moved downward to withdraw the cam surface 58 from the handles 30 and 31 so that the levers can be moved back to their retracted position.

Fig. 3 shows one of the handles in its extreme retracted position. Fig. 4 shows one of the handles in a position when the slow feed is about to commence, and Fig. 5 shows one of the handles in a position when the slow feeding has just ended.

As shown in Fig. 6 the feed block 24 which is similar in structure to the feed blocks 23 and 25 is constructed with apertures through which the wires 26 are adapted to pass. In the forward portion of each feed block is a hollow portion 63, the rearward end of which is slightly beveled and in the rearward end of which is adapted to fit two small beveled blocks 64 and 65 between which and a middle rib 66, wires 26 are adapted to pass. These beveled blocks 64 and 65 are normally held in position against the beveled portion of the hollow portion 63 by means of springs 67 and 68. It will thus be seen that when the block is moved forward the tendency of the wires to slide backwards with respect to the blocks will force the small blocks 64 and 65 in tight engagement with the wires whereas the reverse movement of the feed blocks will release this grip on the wires.

In the operation of the device we will assume a glass rod has been fed into the mould 6 and that the wires are introduced through the various feeding devices into a position shown in Fig. 3$^b$. The feed handles 30 and 31 are then moved forward to the position shown in Fig. 4 in which position the wires are in a position shown in Figs. 4$^a$ and 4$^b$, which show respectively the positions of the wires inserted adjacent the end and the sides of the glass rods.

Just previous to this instant, the glass rod has been subjected to the action of the flames for a suitable time and the portions of the rods into which the wires are to be inserted are softened to the proper degree. The handle portion 57 is then moved to slowly feed the levers 30 and 31 forward, whereupon the wires are slowly pushed into the softened glass, and when the slow feeding motion is completed the levers 30 and 31 are in a position shown in Fig. 5 and the wires are in positions shown in Figs. 5$^a$ and 5$^b$. The feed levers 30 and 31 are quickly moved backward and just at the end of their stroke they operate the knife blades 35, as above described, to cut the wires inserted in the glass at a predetermined distance from the glass. The rod 14 connected to the ejector is then actuated in any suitable manner and the completed article is removed from the mould 6 and slides down through the channel 50 into a hopper. As the ejector 10 is moved, its front edge is removed from in front of the lower end of the trough section 47 so that the next glass rod which is in this section can slide down into the mould 6 and become subject to the action of the flames. Thereafter the ejector moves back into place around the mould 6 and the feed handles 30 and 31 are moved forward again at the proper time. As the feed handles move forward the oscillating section 45 is moved in line with the trough section 47 and another glass rod slides down this section into a position adjacent the end of the ejector 10 ready to move into position in the mould when the ejector removes the next completed rod.

In Fig. 8 is shown the wires 26 inserted in pairs into the glass rod, one pair extending into the end of the rod and the other pairs extending into the rod in pairs from opposite sides.

Fig. 9 shows the glass rod mounted on the stem of an evacuated vessel, such as a vacuum tube with the wires bent over in the manner shown to support the various electrodes within said vessel.

By the expression "rod," it is to be understood that a hollow tube as well as a solid rod may be used.

What is claimed is:

1. In glass working, a holder for the article to be worked upon, means for producing a fused zone thereon, and a guide on said holder for a wire to be inserted in said article.

2. A glass working machine comprising ejector mechanism adapted to strike a wire inserted in a glass article for ejecting said article.

3. A machine for inserting wires into glass comprising means for feeding the wires rapidly up to the glass, and means for slowly forcing the wires into the glass.

4. A machine for inserting wires into glass comprising means for heating the glass, means for feeding the wires rapidly up to the glass, and means for slowly feeding the wires into the glass when heated.

5. A machine for inserting wires into glass rods comprising means for feeding the rods automatically into position, means for heating the glass, means for feeding the wires rapidly up to the glass, and means for slowly forcing the wires into the glass.

6. A machine for inserting wires into glass comprising mechanism for feeding the wires rapidly up to the glass, mechanism for slowly forcing the wires into the glass, means for cutting off the wires at a definite distance from the points of insertion, and means for ejecting the glass with the wires inserted into a suitable receptacle.

7. A machine for inserting wires into glass rods comprising a mold receptacle for said rods, a conveyer, means for automatically feeding said rods through said conveyer to said receptacle, means for heating the rods, means for feeding the wires up to the glass, and means for slowly forcing the wires into the glass.

8. A machine for inserting wires into glass rods comprising a mold receptacle for the rods, means for heating the rods, lever mechanism for feeding the wires up to the rods, a second lever mechanism for slowly forcing the wires into the rods, cam mechanism for cutting off the wires a definite distance from the points of insertion and after insertion, and lever mechanism for ejecting the rods with the wires inserted into said receptacle.

9. A machine for inserting wires into glass comprising a pair of levers for feeding the wires up to the glass, movable stops to determine the feeding limit of said levers, a plurality of cams adapted to further actuate said lever to slowly force the wires into said glass, and means for simultaneously actuating said levers by said cams and withdrawing said stops from the front of said levers.

10. A machine for inserting wires into glass comprising a mold receptacle for the glass, lever mechanism for feeding the wires up to said glass, a second lever mechanism for slowly feeding the wires into the glass, and cutting mechanism adapted to cut the wires at a definite distance from the points of insertion from the said cutting mechanism, actuated upon and by the return of the first lever mechanism to its normal position.

11. A machine for inserting wires into glass comprising a receptacle for the glass, a plurality of lever-actuated feeding devices for said wires, a trip-in on each of said feeding devices, a cutting mechanism adjacent said feeding devices, a pivoted lever associated with said cutting mechanism and lying normally in the path of said trip-pin, whereby said cutting mechanism is actuated upon the return of the feeding devices to normal position.

12. A machine for feeding wires into glass rods comprising a rod holder, a plurality of feeding devices located in the same plane and perpendicular to the axis of said holder, a feeding device substantially coaxial with said holder and means for simultaneously actuating all of said feeding devices.

13. A machine for inserting wires into glass rods comprising a mold receptacle for the glass rods, a conveyer for the rods leading to said receptacle, a mechanism for feeding wires to said rods, said conveyer comprising two sections, a pivoted plate between the two sections, said plate being normally in line with the conveyer section further from the mold receptacle, and adapted to receive the rods, and mechanism connected to said pivoted plate and said feeding mechanism whereby when said feeding mechanism is moved to feed the wires, the pivoted plate is moved into alignment with the second section of the conveyer to feed a rod in said mold receptacle.

14. A mechanism comprising a plurality of feeding devices adapted to move toward and away from each other, a feeding device in the same plane with said first named feeding devices and adapted to move in a direction perpendicular to the direction of movement of said first named feeding devices, and a single element for causing simultaneous movement of said feeding devices.

15. A machine for inserting wires into glass rods which comprises mechanism for inserting a plurality of wires in a rod substantially radially of the axis thereof, a mechanism for inserting a wire substantially coaxial of said rod and means for simultaneously actuating said mechanisms.

In witness whereof, we hereunto subscribe our names this 27th day of August, A. D. 1919.

WALTER J. LEVERIDGE.
PAUL SCHWERIN.